2 Sheets—Sheet 1.
W. W. GOLSAN.
Seed-Planter.
No. 29,878. Patented Sept. 4, 1860.
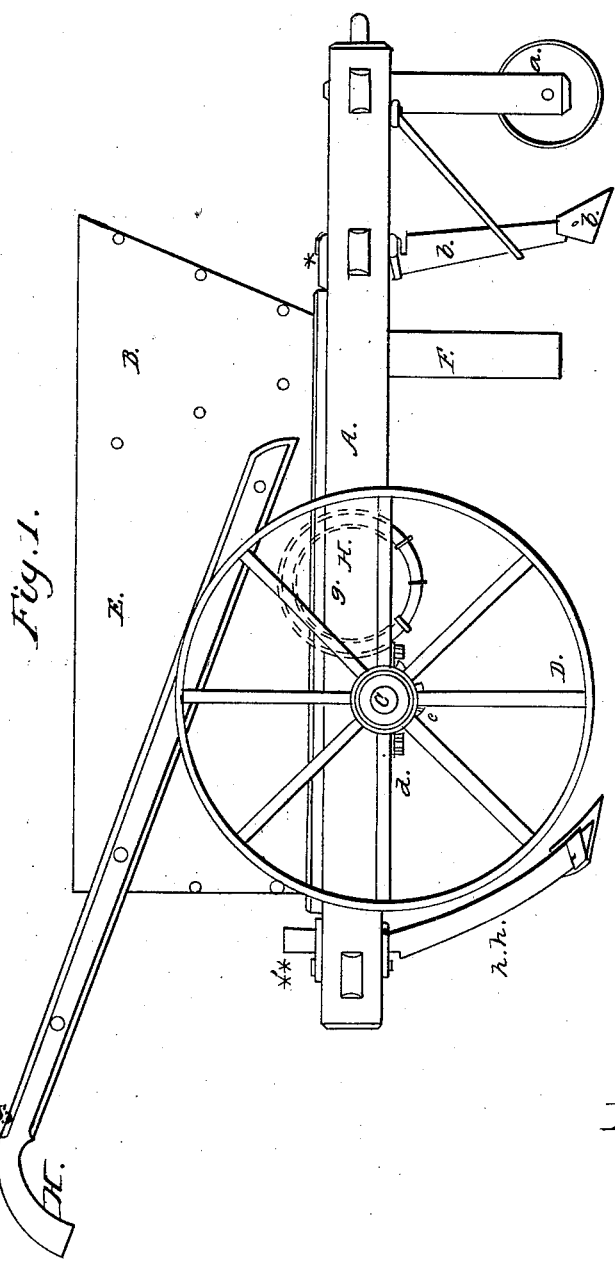

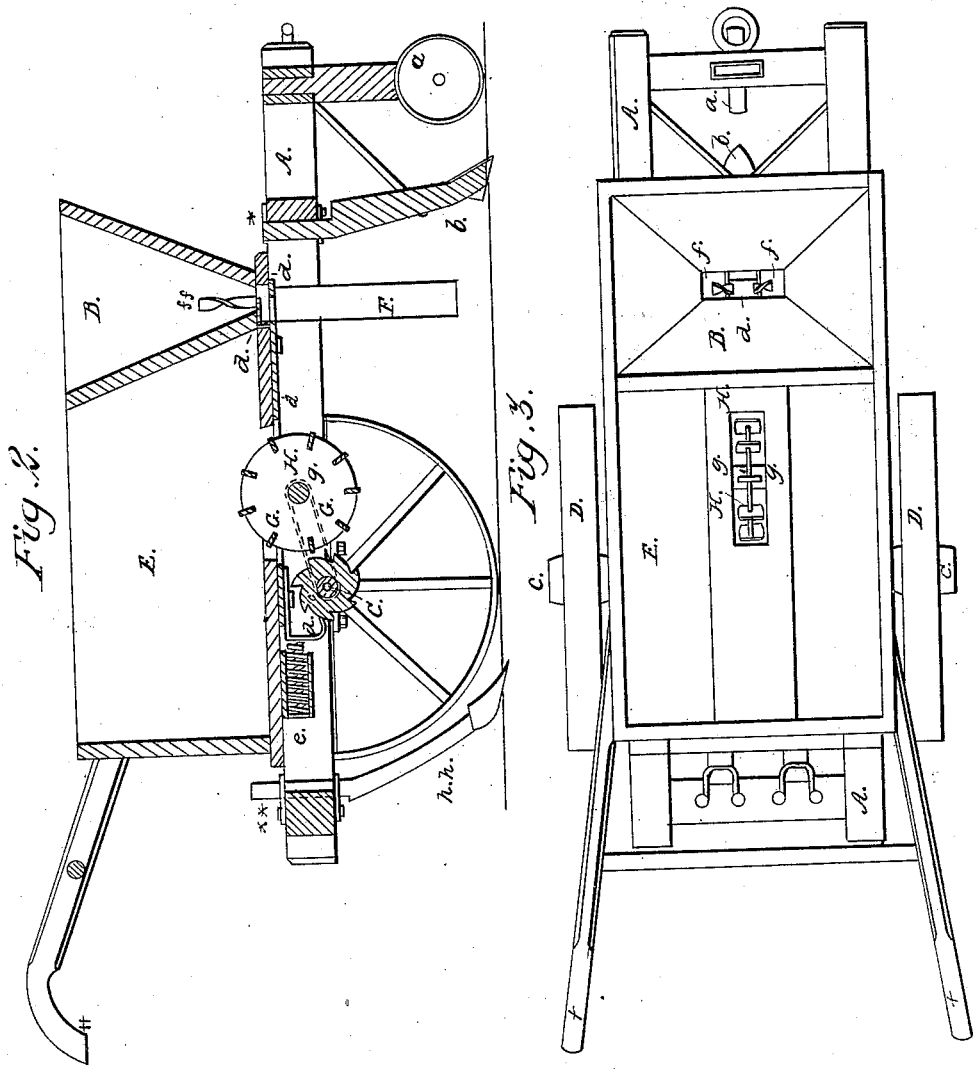

UNITED STATES PATENT OFFICE.

W. W. GOLSAN, OF AUTAUGAVILLE, ALABAMA.

IMPROVEMENT IN SEED-PLANTERS.

Specification forming part of Letters Patent No. 29,878, dated September 4, 1860.

*To all whom it may concern:*

Be it known that I, W. W. GOLSAN, of Autaugaville, in the county of Autauga and the State of Alabama, have invented a new and Improved Seed-Planter; and I do hereby declare that the following is a full, clear, and exact description of the same, reference being had to the accompanying drawings, forming a part of this specification, in which—

Figure 1 is a longitudinal view of my improved planter. Fig. 2 is a section view, and Fig. 3 is a plan view of the same.

Similar letters of reference in each of the figures indicate corresponding parts.

To enable others skilled in the art to make and use my invention, I will proceed to describe its construction and operation.

The frame A is an elongated square.

*a* represents a coursing-wheel.

*b* is a plow for making the furrow designed to be planted. This plow can be raised or lowered, when desired, at the point marked *, where it can be securely wedged.

B is a hopper, in which the seed is deposited. On the center of the axle C, which axle revolves with the wheels D D, (and which revolves in boxes secured to the lower part of the frame,) there is a cam-wheel, *c*, which at the action of the axle strikes the hook of a slide, *d*. This slide at the hook is attached to a horizontal spiral spring, *e*, which spring is fastened to the bottom of the hopper E and in the rear of the slide *d* and axle *c*. The slide *d* extends horizontally to the front of the hopper B. In the bottom of this hopper a square hole is mortised for the seed to pass out, and there is a corresponding hole in the slide *d* beneath the hopper; but at the rear side of the hopper B there arises an elbow from the slide to a level with the floor of the hopper, and it extends forward as the floor of the hopper equidistant to the square hole cut in the lower part of the slide, which square may be made larger or smaller for larger or smaller seed. This extension of the elbow of the slide covers half (more or less) of the mortised square in the hopper, and also covers entirely the square cut in the lower part of the slide; but at the movement of the wheels D D, the axle C, and the cam-wheel *c* the slide, by means of the spring *e*, works both elbow and lower part horizontally, and thus this backward and forward movement permits the seed to pass from the hopper down in front of the elbow part of the slide, and through the square cut in the lower part of the slide into and through the pipe F, and thus into the furrow at the rear of the plow *b*. The rapidity of motion is increased or diminished, as well as is the number of seed dropped increased or diminished, according to the number of the teeth on the cam-wheel *c*.

Attached to the surface of the elbow part of the slide and within the hopper B there are two upright posts, *f f*, which move in the hopper at the action of the slide, and thus stir up and loosen the seed, preventing it from clogging or remaining in the hopper.

B is another hopper, in which manure is deposited. On the axle C there is a belt, G, which passes around a drum on the shaft *g*. This shaft revolves in boxes secured to the bottom of the hopper E. On the center of this shaft there is an agitating-wheel, H, with blades. This wheel passes through the slide *d* into the hopper E equidistant, and at the action of the axle C this wheel revolves, and the blades stir up and force the manure from the hopper E (in quantity according to the size and number of the blades) through the slots in the hopper and slide in which the wheel H revolves into the furrow in the rear of the seed planted.

*h h* are two plows or plow-hoes, so placed as to effectually cover and bed the seed and manure thus planted and spread. These plows are also raised or lowered at discretion, and wedged in the frame the same as the plow *b*.

To back the machine it is necessary to raise it off of the wheels D D by means of the handles marked † †, thus throwing the weight upon the coursing-wheel *a*.

In case it should be desirable to work the planter separate from that part of my machine that spreads the manure, or vice versa, it can be easily accomplished.

What I claim as my invention, and desire to secure by Letters Patent, is—

The combination of cam-wheel C, agitating-wheel H, spring *e*, and slide *d*, the whole being constructed and arranged in the manner and for the purpose herein described.

The above specification signed and witnessed this 16th day of August, 1860.

W. W. GOLSAN.

Witnesses:
 R. T. BIRCHET,
 EDWIN R. KING.